June 8, 1965 N. S. KAPANY 3,187,627
MICROSCOPE AND RECORDING OPTICAL SYSTEMS UTILIZING
TAPERED LIGHT CONDUCTING FIBER BUNDLES
Filed Oct. 3, 1960 2 Sheets-Sheet 1
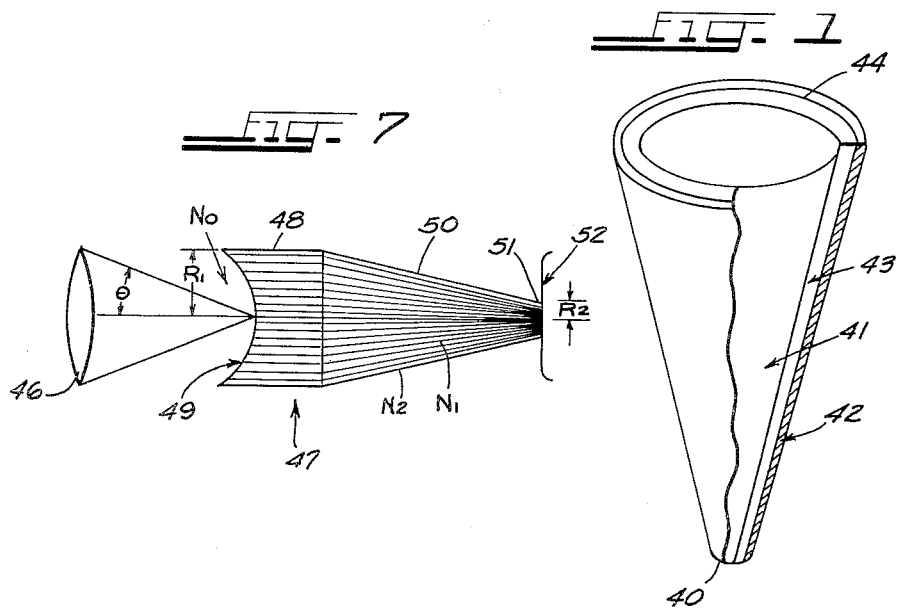
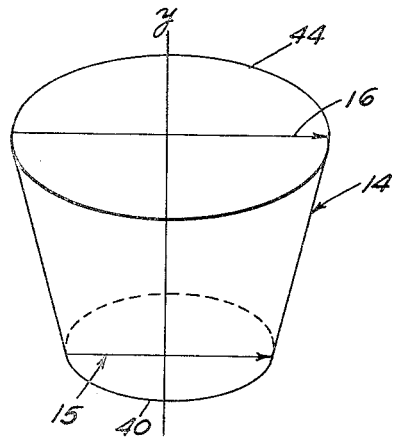
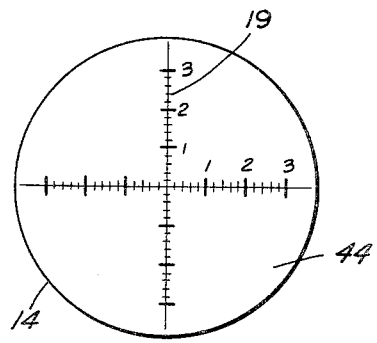
INVENTOR.
NARINDER S. KAPANY

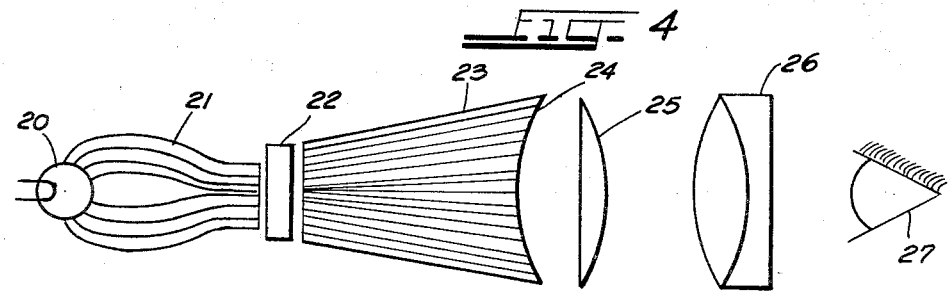
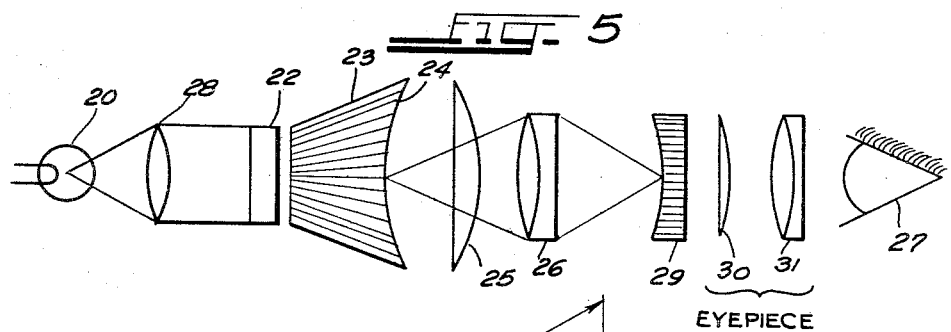
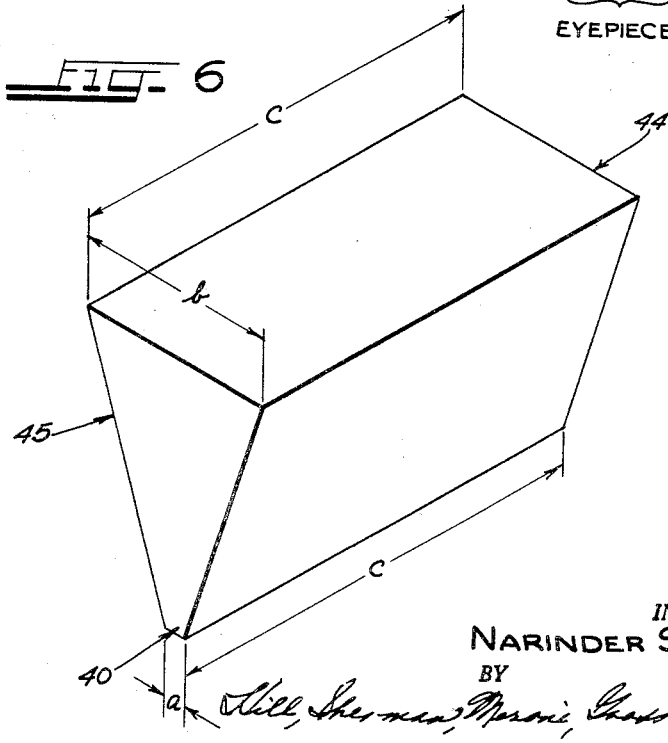
INVENTOR.
NARINDER S. KAPANY

United States Patent Office 3,187,627
Patented June 8, 1965

3,187,627
MICROSCOPE AND RECORDING OPTICAL SYSTEMS UTILIZING TAPERED LIGHT CONDUCTING FIBER BUNDLES
Narinder S. Kapany, Belmont, Calif., assignor, by mesne assignments, to American Optical Company, a voluntary association of Massachusetts
Filed Oct. 3, 1960, Ser. No. 59,939
9 Claims. (Cl. 88—39)

This invention is directed to optical instruments and more particularly to fiber optics magnifiers and/or microscopes.

It is well known that the limiting resolution of the best microscope is set by the wavelength of light. In order to achieve this resolution, high numerical aperture microscope objectives are required. High numerical aperture objectives are of necessity complex, because of aberration tolerance; and furthermore, they possess very small field coverage. The numerical aperture of the oil immersion microscope objectives have a maximum value of approximately 1.30. For air the upper limit (numerical aperture of the lens) is approximately 0.95 in practice, however, high power microscopes increase such limit by immersing the object in a liquid.

The larger the numerical aperture, the higher the resolving power of the lens. Resolving power being the ability of a system to be able to resolve two point sources if the corresponding diffraction patterns are sufficiently small; or, better yet, adequately separated to be distinguished. The minimum separation of two point sources of light distinguishable by an optical instrument, such as a microscope, is called the limit of resolution of the instrument. This limit of resolution is inversely proportional to the instrument's resolving power. In other words, the smaller limit of resolution, the greater the instrument's resolving power.

Off axis aberrations establish the limit of object area acceptable to preclude an undue amount of distortion. This limit in object size is generally referred to as the field of view of the lens system. More particularly, this limit is known as the field angle and represents the maximum acceptable tolerance of object size for a specific optical instrument, lens or a magnifier.

The field angle α of a lens is the half angle subtended by an object incident at the face of a lens along its optical axis. This field angle is the limiting factor of viewing field of a lens; that is, objects having portions thereof extending beyond the angle α will not be completely acceptably viewed through the lens.

On the contrary, a frusto-conical bundle of coated optical fibers, because of the basic principal of fiber optics, introduces no aberrations or distortion to the image passing therethrough and hence has a much larger field angle. This is because a fiber acts as a homogenous, non-spherical, light transmissant mass treating the light transmitted thereby, uniformly throughout. Without aberrations the field angle of the bundle is essentially unlimited. In other words, object size is limited only by the linear size, in cross section, of the object end of the fiber.

Since the field of view of a fiber is materially larger than that of a spherical or curved lens, it has greater versatility than the curved lens. Furthermore, the bundles of fibers can be made having degrees of magnification and resolution comparable to prior art devices.

It is accordingly a general object of the instant invention to present an improved magnifier or microscope that will provide a greater field angle for a given power magnification than the instruments heretofore presented.

It is a further object of the instant invention to present an improved magnifier or microscope of less costly manufacture.

A still further object of the present invention is to present an improved magnifier or microscope of less costly manufacture exhibiting improved field angle and having a built-in reticle.

Another object of the instant invention is to present an improved magnifier consisting of a bundle of fused light transmissant dielectric fibers.

Yet another object of the instant invention is to present an improved magnifier for use in a lens system whereby distortion is minimized in said system.

Still another object of the instant invention is to present an improved magnifier for use in a lens system which increases the speed and decreases the distortion of the system.

The foregoing objects and others, which will become apparent to the reader from the description hereinbelow, are accomplished by employing a bundle of fused dielectric fibers of generally frusto-conical geometry as the magnifier.

In the drawings:

FIGURE 1 is a greatly enlarged view of a single coated fiber.

FIGURE 2 is a schematic perspective view of a magnifier in accordance with the principles of the instant invention.

FIGURE 3 is a view of a magnifier with a built-in reticle.

FIGURE 4 is a schematic illustration of a direct viewing fiber microscope.

FIGURE 5 is a schematic illustration of another type of fiber microscope.

FIGURE 6 is an illustration of a direct reading magnifier constructed in accordance with the principles of the instant invention.

FIGURE 7 discloses another embodiment of the invention.

Before proceeding with the detailed description of this invention, a brief description of mechanism of light transmission through optical fibers would be helpful.

A light impinging one end of a solid dielectric rod will travel therethrough reflecting back and forth along the internal wall of the rod. This reflection is brought about by the refractive index change at the interface of the rod and the surrounding medium. However, if a multiplicity of optical fibers were used (instead of the rod), the rays would not encounter the refractive index change where the fibers are touching; thus causing light to leak between fibers. Because of this phenomenon, a thin coating of another dielectric having a lower refractive index (light absorbant) is applied to each individual fiber. Now the light rays travelling through the fiber, which for the most part are internally reflected, are substantially completely internally reflected because of the coating.

Where extremely small fiber diameters are used, an additional coating (usually a metal) is applied to further prevent the escape of any internally travelling light rays. This second coating minimizes inter-fiber ray interference (hereinafter termed interaction), and hence obviates image distortion. This interaction may be thought of as analogous to crosstalk in voice communications through a multiwire telephone cable.

For a more detailed description of fiber optics, the reader's attention is directed to co-pending application Serial No. 750,811, now abandoned.

The concept of this invention is best expressed in FIGURE 1 wherein a greatly enlarged view of a coated fiber 41 is shown having two coatings 42 and 43. Fiber 41 has a high refractive index and is surrounded by a coating 43 of another dielectric material having a lower refractive index. In this manner light entering object end 40 of fiber 41 is substantially completely internally reflected when it impinges the interface between fiber 41 and coating 43. Surrounding coating 43 is a thin light absorbant, coating 42 which is usually metal. Metallic absorbant coating 42 prevents light wave interaction between fibers in a fused bundle of very small diameter fibers. While coating 42 minimizes interaction between fibers, it is not required in many optical systems where either the individual fiber diameter is large and/or the fiber is capable of accepting the extreme oblique rays. Furthermore, interaction is appreciable only when the individual fiber diameters are on the order of a few wavelengths.

The thicknesses of coatings 42 and 43 will vary; however, they are generally about $\lambda/20$ and $\lambda/4-\lambda$ respectively, where $\lambda$ is the wavelength of light.

Object end 40 of fiber 41 (hereinafter termed "entrance end") picks up one bit of intelligence and transmits this information therethrough. Such bit of information is displayed at the emergent end 44 of fiber 41 and its size is represented by the cross section of emergent end 44 of fiber 41. If this bit of information completely covered the face of entrance end 40, it would also completely cover the face of emergent end 44. Accordingly, the degree of magnification of the fiber is the ratio in cross section of emergent end 44 to entrance end 40.

When a number of these fibers are fused together to form a bundle, bits of information are transmitted, individually, by the fibers and combine to form an image. Therefore, as in the case of a single fiber, the ratio in cross section of the emergent end 44 (see FIGURE 2) to the entrance end 40 (see FIGURE 2) of a bundle of fibers constitutes the magnifying power of the unit. FIGURE 2 illustrates a fused bundle of fibers used as a magnifier 14. The object 15 appearing at entrance end 40 is magnified and appears, in its magnified form as image 16 at the emergent end 44 of magnifier 14.

With circular cross sections at both ends as shown, magnifier 14 has a magnifying power $m$ of:

$$m = \frac{r_1}{r_2} \quad (1)$$

where $r_2$ and $r_1$ are the radii of the entrance and emergent ends of the conical fibers respectively.

It is well known that when a multiplicity of glass rods, or any other thermoplastic material, are co-drawn, the individual rods will bear the same spatial relationship with respect to each other in their attenuated form as they had originally. Use is made of this principle to provide a built-in reticle in the fiber magnifier. As shown in FIGURE 3, various indicia 19 appearing on emergent end 44 provide a measurement reference for objects viewed through magnifier 14.

To this end, the rods, which after attenuation may collectively take the form of a frusto-conical bundle of fibers, have interspersed thereamongst colored or opaque rods of glass, or any other compatible material predeterminately spatially distributed. For example, if mutually orthogonal linear measurement means are desired, colored rods 19 are uniformly spaced in the original bundle of rods corresponding to such linear measurement.

In determining the original spacing, the colored rods 19 would be spaced apart a distance represented by:

$$X = my \quad (2)$$

where X equals the original spacing, $m$ is the magnifying power, and $y$ is the smallest unit of measurement sought to be incorporated.

For example, if magnifier 14 had a power $m$ of sixteen and the reticle is to provide a reference in quarter inches, the colored rods 19 would be spaced apart four inches. This spacing is, of course, at emergent end 44 of magnifier 14. It being understood that rods 19 are one-quarter inch apart from each other at entrance end 40.

FIGURE 4 depicts a direct viewing fiber microscope. Light source 20 is employed as in conventional microscopes, to illuminate object 22. Fiber condenser 21 comprises a number of coated fibers having their entrance end encircling a substantial portion of light source 20. The coated flexible fibers are very closely spaced and bound to form a bundle at their radiant end, thereby concentrating the light beam to illuminate object 22. Adjacent object 22 is fiber magnifier 23 having curved emergent end 24. As previously described, the degree of magnification of magnifier 23 will be the ratio in area of emergent end to entrance end. End 24 would normally be planar because curves surfaces tend to distort the image; however, it is concave to compensate for the subsequent field curvature inherent in the succeeding optical system 25–26 in order that the end result is a flat field. As such, emergent end 24 is identified as a field flattener. By this scheme, observer 27 views an undistorted image pattern through the system 25–26.

FIGURE 5 illustrates a fiber microscope having fiber magnifiers, both in the objective and the lens system. Source 20 radiates light impingent upon corrected collimator 28 which illuminates object 22. Corrected collimator 28 is shown in the figure; however, fiber condenser 21 (see FIGURE 4) is equally suitable and may be used in place thereof. Object 22 is magnified by fiber magnifier 23 in the manner previously described and likewise has a curved emergent end 24 acting as a field flattener. The image will pass through lenses 25 and 26 through an additional fiber field flattener 29, eyepiece 30–31 and appear in an undistorted manner to observer 27.

In FIGURE 6 is shown another embodiment of this invention which is especially suited for reading lines of fine print. The power of this magnifier 45 is the ratio of side $b$ to side $a$. When using an ordinary magnifier for reading, the user must focus on the print and scan from left to right and top to bottom on each page, and at the same time continually keep the print in focus. Contrariwise, with side of $c$ of magnifier 45, the length of a line of print, the user need only scan from top to bottom of each page. Furthermore, the problem of focusing is obviated because of the wide field angle inherent in a fiber optics magnifier. That is to say entrance end 40 touches (sliding contact) the page.

In FIGURE 7 is depicted another embodiment of this invention wherein the conical fiber bundle is applied in reverse in order to increase the photographic speed of a lens system, as for example, a camera lens system. As previously discussed, a curved lens introduces field curvature (fuzzing the image) to light rays passing therethrough. This is what happens to rays passing through lens 46. However, if these rays are directed onto a curved surface 49 of a bundle of fused optical fibers 47, the field is flattened and the image is undistorted. In this case also, surface 49 acts as a field flattener.

Fiber bundle 47 has a cylindrical portion 48 providing distortion free images. The conical portion 50 of bundle 47 functions in the same manner as those previously described; however, in this case the image is concentrated at emergent end 51. When this unit 47 is utilized in a camera, film 52 is in juxtaposition with emergent 51 to record the image. In this way, unit 47 corrects for field curvature and distortion of the image and also increases the light gathering power (photographic speed) of the system by concentrating the image.

The design criteria for unit 47 when used as a "conical condenser" is governed by the $f$-number of lens 46 and optimum performance is obtained where:

$$(N_0) \sin \theta = \frac{R_2}{R_1}(N_1^2 - N_2^2)^{1/2} \quad (3)$$

wherein, $\theta$ is the half angle subtended by lens 46 on the center of curved entrance end 49 of condenser 47, $R_1$ is the radius of entrance end 49, $R_2$ is the radius of emergent end 51, $N_0$ is the index of the medium, $N_1$ is the index of magnifier 47 and $N_2$ is the index of the surrounding coating medium.

From the foregoing, it will be seen that a new concept in magnification and reduction has been provided. The fiber magnifiers of the instant invention can be used with, or in place of, conventional systems. With respect to resolution, it is noted that the smallest resolvable area of an object in the object plane using conventional magnifying systems is defined by:

$$d = \frac{0.61\lambda}{N \sin \theta} \quad (4)$$

where $d$ is the object size; $\lambda$ is the wavelength of light; $N$ is the index of refraction of the medium through which the light passes, and $\theta$ is the half angle subtended by the point object at the periphery of the lens. The smallest resolvable area "$d$" obtainable up to the present time is approximately 0.4. The magnifier of the instant invention approximates this value of "$d$" with the use of appropriate design materials.

Along these lines, one can show from customary dielectric wave guide analysis, that when the fiber diameters become comparable to the wavelength of light, the energy penetrates deeper into the external medium. However, an interaction and light leakage will occur between fibers when they are placed too close to one another. Thus, the required spacing between fibers, in order to eliminate any interaction, increases as fiber diameters decrease. For high resolution fiber systems, therefore, it is required that the fiber diameter be small and the spacing between the fibers be minimum. The required intermediate spacing goes down as the ratio of $N_1$ to $N_2$ increases and as the fiber diameter increases. For visible light, $N_1$ and $N_2$ of 1.9 and 1.5 have been used and resulted in a reduction of coating thickness to approximately one wavelength for fibers approximately one wavelength in diameter. For the infrared region even smaller coating thicknesses can be tolerated because of the high refractive indices of most infrared transmitting materials, e.g. 4:1.3.

Another parameter that is introduced in order to eliminate interaction between an assembly or bundle of submicron fibers consists of introducing a metallic second or absorbing coating (heretofore discussed) around each conical fiber. This coating results in a certain amount of light loss; however, it allows the use of conical fibers down to a fraction of a wavelength in diameter at the entrance end, thereby yielding resolution equal to or better than that of existing microscopes.

It is interesting to note that such a conical fiber with, let us say, a core diameter of $\lambda/2$, a glass coating thickness of $\lambda/10$ and a metallic second coating of 300–500 Angstroms thick at the smaller end, and increasing proportionally to many times that size at the larger end acts both as a metallic as well as a dielectric wave guide. The energy impinging the smaller ends of the fiber's core penetrates into the glass coating and is partially reflected back, thus acting as a metallic wave guide. On the other hand, the energy reaches the cone element where the core diameter exceeds a few wavelengths and the glass coating thickness has increased proportionately ($\lambda/4$–$\lambda/2$) most of the energy is totally reflected and does not reach the second metallic coating. Thus the absorption by the metallic coating takes place only over a short length at the entrance end of the fibers; however, it does allow the use of much smaller elements without any interaction therebetween.

From the foregoing discussion, it becomes apparent that the cone angle should be made as large as possible at the smaller end of the cone. Also, the fiber cone should be constructed from glasses having a high index of refraction and in the visible spectrum glasses having an index of approximately 1.9 are available. In the infrared spectrum the index may be approximately 4 or more. The first coating should be a low index, transparent material where in the visible and infrared range this index is approximately 1.3. The second coating, the metallic coating, acts as a light absorber and silver or aluminum work quite well.

Obviously, modifications will occur to those skilled in this art without departing from the spirit or scope of this invention.

I claim as my invention:

1. A microscope including a light source and a conventional field lens system in optical alignment, a condenser interposed between said light source and an object plane of said microscope for concentrating light on an object at said object plane, a fiber optical magnifier consisting of a very large number of thin coated conically shaped optical fibers secured together in similar side-by-side relation so as to form a fiber optical bundle having a small entrance end face in juxtaposed relation to said object plane and a larger concave emergent end face at the opposite end of said bundle, whereby said concave end face has a larger cross sectional size than said entrance face, said field lens system being adapted to receive light rays from the concave face of said bundle and focus same at an image plane in said microscope, each of said thin coated conically shaped fibers of said bundle being formed by a core of a light transmissant dielectric material of a predetermined refractive index, a first relatively thin coating surrounding said core and formed of a dielectric material of a relatively lower refractive index and a second thinner coating surrounding said first coating and formed of a metallic material, the smaller ends of said conically shaped coated fibers adjacent said object plane each having a diameter no greater than approximately the wavelength of the light to be transmitted thereby so as to improve the resolution of the image being transmitted thereby, and said condenser and magnifier being in coaxial mutually coextensive relation with said light source and said field lens system.

2. A microscope as defined in claim 1 and wherein the smaller ends of said conically shaped coated optical fibers are submicron in size, said first coating thickness being in the order of one fifth of the thickness of the fiber core diameter and said metallic second coating being in the order of from 300 to 500 Angstroms in thickness.

3. A microscope including a light source, a conventional field lens system and an eyepiece system in optical alignment, a condenser interposed between said light source and an object plane of said microscope for concentrating light on an object at said object plane, a fiber optical magnifier consisting of a very large number of thin coated conically shaped optical fibers secured together in similar side-by-side relation so as to form a fiber optical bundle having a small entrance end face in juxtaposed relation to said object plane and a larger concave emergent end face at the opposite end of said bundle, whereby said concave end face has a larger cross sectional size than said entrance face, said field lens system being adapted to receive light rays from the concave face of said bundle and to focus same at an image plane in said microscope, each of said thin coated conically shaped fibers being formed by a core of a light transmissant dielectric material of a predetermined refractive index, a first relatively thin coating surrounding said core and formed of a dielectric material of a relatively lower refractive index, and a second thinner coating surrounding said first coating and formed of a metallic material, the smaller ends of said conically shaped coated fibers adjacent said object plane each having a diameter no greater than approximately the wavelength of the light to be transmitted thereby so as to improve the resolution of the image being transmitted thereby, a field flattener consisting of a disc-like bundle of thin, coated optical fibers secured together in side-by-side relation, said disc-like bundle having a curved front face and a flat rear face and interposed between said field lens system and said eye lens system with the concave face thereof facing said field lens system, and said condenser, said magnifier and field flattener being in coaxial mutually coextensive relation with said light source, said field lens system and said eye lens system.

4. A microscope as defined in claim 3 and wherein the smaller ends of said conically shaped coated optical fibers are submicron in cross sectional size, said first coating thickness being in the order of one fifth the thickness of the fiber core diameter and said metallic second coating being in the order of from 300 to 500 Angstroms in thickness.

5. An improved optical image recorder comprising a photographic objective having a predetermined field curvature at an image plane thereof, and a fiber optical image transmitting bundle optically aligned with said objective, said fiber optical bundle being arranged to receive an optical image from said objective and to transmit same to a recording media in contacting relation with a substantially flat emergent end surface thereof, said fiber optical bundle comprising first and second contiguous aligned sections each formed of a very large number of thin coated optical fibers secured together in side-by-side relation, said first section having a concavely curved entrance end surface thereon facing said objective and disposed in substantial coincidence with the curved image plane of said objective, and said second section being of a generally frusto-conical configuration and having said substantially flat emergent end surface formed thereon, each of said thin coated optical fibers comprising a core formed of a light transmissant dielectric material of a predetermined refractive index, a first relatively thin coating surrounding said core and formed of a dielectric material of a relatively lower refractive index, and a second thinner coating surrounding said first coating and formed of a metallic material, the smaller ends of said conically shaped coated fibers each having a diameter no greater than approximately the wave length of light to be transmitted thereby so as to improve the resolution of the optical image being transmitted thereby to said recording media.

6. An optical image recorder as defined in claim 5 and wherein the smaller ends of said conically shaped coated optical fibers are submicron in cross sectional size, said first coating thickness being in the order of one fifth the thickness of the fiber core diameter, and said metallic second coating being in the order of from 300 to 500 Angstroms in thickness.

7. A fiber optical image transmitter of the type described comprising a very large number of thin coated optical fibers secured together in similar side-by-side relation so as to form a fiber optical bundle having an entrance surface for receiving an optical image at one end thereof and an emergent surface at the opposite end thereof, the optical fibers forming said bundle each being of a frusto-conical shape intermediate its opposite ends so that when said fibers are bunched together they will provide at one end surface of said bundle an appreciably larger cross sectional area than at the other end thereof, the smaller end surface of said bundle being a substantially flat surface so as to receive a flat object surface in juxtaposed relation thereto, and the other end surface of said bundle being of a predetermined concave curvature so as to coincide substantially with the known curvature of field of a lens to be optically aligned therewith and focused thereon, each of said thin coated optical fibers being formed by a core of light transmissant dielectric material of a predetermined refractive index, a first relatively thin coating surrounding said core and formed of a dielectric material of a relatively lower refractive index, and a second relatively thinner coating surrounding said first coating and formed of a metallic material, the smaller end of each of said coated fibers being of a cross sectional size no greater than approximately the wavelength of the light to be transmitted thereby, whereby an image having improved resolution will be transmitted by said bundle.

8. A fiber optical image transmitter as defined in claim 7 and wherein a plurality of differently appearing fibers are interspersed among the very large number of optical fibers of said bundle in such a manner as to form a built-in reticule for said transmitter.

9. A fiber optical image transmitter as defined in claim 7 and wherein the smaller ends of the conically shaped coated optical fibers are submicron in size, said first coating thickness being in the order of one-fifth of the thickness of the fiber core diameter and said metallic second coating being in the order of from 300 to 500 Angstroms in thickness.

References Cited by the Examiner

UNITED STATES PATENTS

| 2,825,260 | 3/58 | O'Brien | 88—1 |
| 2,939,362 | 6/60 | Cole | 88—16.8 |
| 3,020,806 | 2/62 | Castrucci | 88—72 |

OTHER REFERENCES

Kapany: "Fiber Optics, Part III, Field Flatteners," article in the "Journal of the Optical Society of America," vol. 47, No. 7, July 1957, pp. 594–598.

Kapany: "Fiber Optics," Appendix N in Strong "Concepts of Classical Optics," textbook published in 1958 (pp. 553–579).

DAVID H. RUBIN, *Primary Examiner.*

EMIL G. ANDERSON, *Examiner.*